Oct. 17, 1967 R. E. WILLIAMS 3,347,983

COLOR FILTER APPARATUS FOR TELEVISION

Filed June 18, 1963

INVENTOR.
RICHARD E. WILLIAMS
BY Hurvitz & Rose

United States Patent Office 3,347,983

Patented Oct. 17, 1967

3,347,983

COLOR FILTER APPARATUS FOR TELEVISION

Richard E. Williams, Fairfax, Va., assignor to Scope Incorporated, Falls Church, Va., a corporation of New Hampshire Filed June 18, 1963, Ser. No. 288,818
7 Claims. (Cl. 178—5.4)

This invention relates to an electro-mechanical color filter for use with a television receiver whose output color information is of the field sequential form.

In a field sequential color television signal, the primary colors are assigned to successive fields in the scanning pattern and the color sequence is introduced as successive fields are scanned. This constitutes a sequential color separation process. When such a signal is applied as intensity modulation on a monochrome cathode-ray tube the partial images are in black and white, and color will be manifested to the viewer if suitable color filters are interposed between the viewer's eye and the cathode-ray tube in synchronization with corresponding fields of the signal. A color filter connected to provide this function was described in detail in co-pending application Ser. No. 282,745, dated May 23, 1963, entitled, "Color Television Display Device." The present invention employs two color primaries and clear areas in a color filter mask to obtain highly stable and well-balanced rendering of color in a simplified system.

The color filter mask includes a light-weight, flexible vibrating aperture plate having vertical stripe apertures as described in the referenced application. A color plate in juxtaposition therewith is provided with color triplets each comprised of a transparent vertical stripe adjacent to two stripes of differing primary colors. During a color telecast, the moving aperture plate vibrates its apertures over the color stripes only, and the vibration waveform is substantially square, dwelling approximately 50% on one color stripe and 50% on the other. During black-and-white telecasts, the entire mask is de-energized and the apertures in the aperture plate are juxtaposed over the clear stripes in the color plate, removing any color filtering per se. The hues of the color stripes constituting the primary colors are chosen to faithfully reproduce those colors appearing most frequently in nature, but are additionally spectrally displaced to accommodate the complementary after-image of the human eye.

The principal object of this invention is to provide a color filter mask having implicit motion stability for color sequencing functions.

Another object of this invention is to provide a color mask which can be rendered devoid of color in a de-energized state.

Still another object of this invention is to provide a two-color filter mask in which complementary after-image effects on the human eye are compensated.

Other objects and advantages of the invention will be apparent from the accompanying drawings, wherein:

FIGURE 1 provides a functional block diagram of a television receiver utilizing the invention;

Throughout the drawings like reference characters refer to like elements in the various figures.

Figure 1:
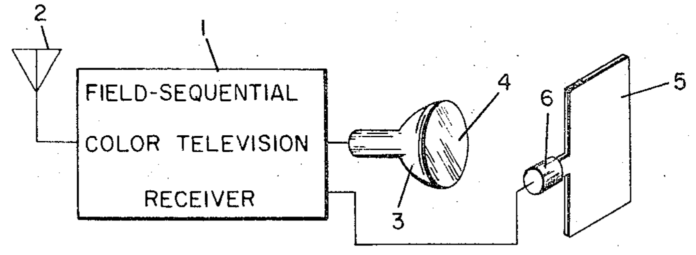

Referring to FIGURE 1, the numeral 1 designates a color television receiver whose output contains a video signal having color information sequenced at the field repetition rate. The signal, which is received via an antenna 2, may be a signal which has been processed by any one of several known techniques to yield the aforementioned field sequential form. A cathode-ray tube 3, which may be of the monochrome variety, displays the successive fields so that the color information appears as intensity variations on the display face 4. A color filter mask assembly 5, parts of which are vibrated by a solenoid assembly 6, is properly synchronized with the field sequential information by appropriate circuitry in the field sequential receiver 1. Thus, at the moment that high intensity portions of the display on the face 4 of the CRT correspond to, say, the color red, the color filter mask 5 turns red. At the moment that the high intensity points on the cathode-ray tube face 4 correspond to another primary color, cyan for example, the filter mask 5 assumes that color.

Figure 2:
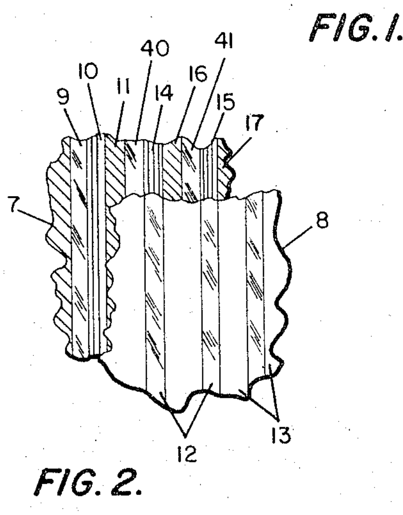
FIGURE 2 is a cut-away portion of the color filter mask showing juxtaposition of aperture plate and color plate.

The color filter portion of the filter mask 5 is similar in some respects to that described in my referenced application above. Referring to FIGURE 2, an aperture plate 8, having clear stripes 12 separated by opaque regions 13, is vibrated rapidly before a color plate 7 having color stripes 10, 11, 14, 16, 15, 17 and clear stripes 9, 40, 41. At any instant, the viewer's eye perceives through the aperture stripes 12 a filter color corresponding to the juxtaposition of colored stripes such as 14 and 15 with the clear apertures 12. Since the apertures 12 are typically separated by distances in the order of 1/16", at normal viewing distance the eye perceives an entire field of a single color.

In the present invention, alternate fields are supplied with information corresponding to the color red-orange and cyan (blue-green), respectively. When the instantaneous position of the aperture plate 8 is as shown in FIGURE 2, the red-orange stripes 10, 14, 15 cause the entire filter mask assembly 5 to appear red-orange. On a succeeding frame, the aperture plate 8 is allowed to move one stripe-width to the right so that the apertures 12 are juxtaposed over cyan stripes 11, 16, 17. The filter mask assembly 5 thus becomes cyan-colored. In the next succeeding frame, the aperture plate 8 is returned to the left so that the red-orange stripes are again uncovered, etc. Since the aperture plate 8 moves a total of one stripe-width from each position to the next, its motion ideally approaches a square wave with minimal time being encompassed in the act of moving and maximal time being devoted to dwells in the two filter color positions. Under present television standards, a blanking interval associated with each field encompasses approximately one-tenth of the field duration, and thus it is desirable that the motion of the aperture plate 8 take place in less than one-tenth of the dwell time associated with one or the other color positions.

Figure 4:
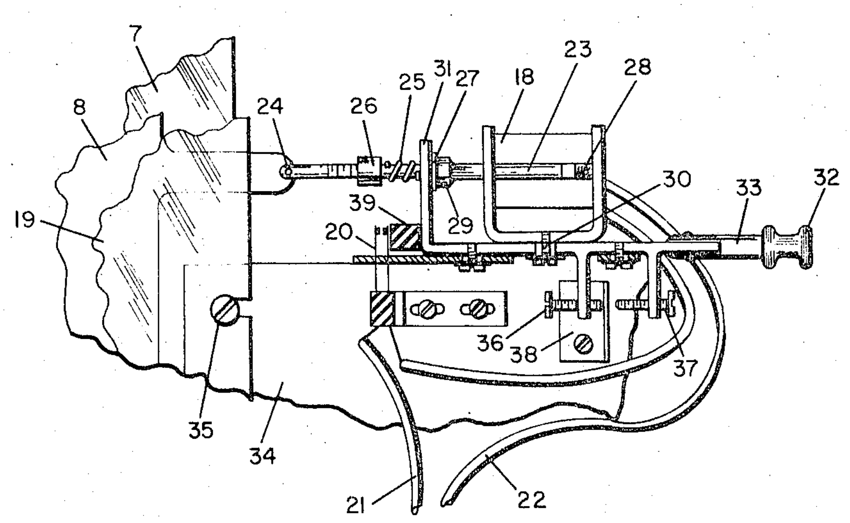
FIGURE 4 is a front view of a mask-actuating mechanism for the system of FIGURE 1.

This ratio it attainable through use of the mechanism of FIGURE 4. The flexible light-weight aperture mask 8 is sandwiched between two rigid members 7, 19, one of which contains the color stripes of FIGURE 2. The two rigid plates 7, 19 allow the aperture plate 8 free vibratory motion from left to right, but captivate it so that it actually rides on sheets of air between the surfaces involved. This portion of the assembly is not unique to the present invention, and is described at some length in the co-pending application referenced above. The square wave vibratory motion is imparted to the aperture plate 8 by means of a solenoid 18 normally driven via a closed switch 20 and leads 21, 22 from a square wave generator appropriately synchronized to the fields of the color signal. The square wave generator, which may take the form of a multivibrator, is well known to the art and accordingly is not further described herein. When connected in this fashion, the solenoid 18 is pulsed with power on alternate fields and pulls the aperture plate 8 to the right by means of an armature 23 and a coupling pin 24. A return spring 25, adjusted for proper compression by a tension nut 26, returns the aperture plate 8 to the left-hand position when the solenoid 18 is de-energized. The motion of the armature 23 is restricted by a pair of semi-elastic pads 27, 28, which may be made of felt or other resilient material. When the solenoid 18 is de-energized, the armature 23 is returned to the left by spring 25 until a shoulder 29, affixed to the armature 23, strikes the opposing pad 27. The total excursion between pads 27, 28 is determined through adjustment 30 which enables the entire solenoid coil 18, together with its bottoming pad 28 to move closer to or further from the pad 27. In practice, the adjustment 30, which is typically a screw in a slotted hole as shown, is set so as to limit the excursion to exactly one stripe-width as discussed relative to FIGURE 2. If, then, the solenoid 18 is slightly overdriven, the mechanical bottoming provided by the pads 27, 28 restricts the excursion to exactly that required for the mask. Thus the motion of the armature 23 is relatively independent of the amplitude of the driving signal or frictional variations in the mechanical components.

It is sometimes desirable to override the solenoid 18 with a sinusoidal wave shape because of the ease of generating that wave-form. In this case, the restrictive pads 27, 28 convert the sinusoidal electronic drive to a square wave mechanical motion. Under the present television standards, the field rate is 60 per second, and thus the square wave or sine wave used to drive the solenoid 18 has a frequency of 30 cycles per second.

The entire assembly, consisting of solenoid 18, armature 23, and felt stops 27, 28, is cradled on a movable base 31. The base 31 can be slid left or right by means of a knob 32 and shaft 33 which is affixed to the base 31. The base 31 slides relative to the main chassis 34, which in turn is held fixed relative to the color plate 7, by suitable means 35. In essence, then, the entire solenoid assembly, including aperture plate 8, can be slid back and forth relative to the color plate 7. The motion of the base 31 is restricted by a pair of adjusting screws 36, 37, that bottom against a mechanical stop 38, affixed to the main chassis 34. The solenoid 18 can be energized for vibratory motion only when the control knob 32 is pushed to the left in the figure, closing switch 20 by means of an insulating actuator 39, affixed to the base 31. The adjusting screw 37 is used to adjust the location of the base 31 in this energized or "color" position, so that the apertures 12 in the aperture plate 8 vibrate precisely across color stripes 14, 16 of FIGURE 2 for correct color registration.

When the actuation knob 32 is pulled to the right, the base 31 slips to the right, opening switch 20 and deactivating the solenoid 18. In this mode the adjusting screw 36 is set so that the apertures 12 in the aperture plate 8 reside in juxtaposition to the clear strips 40 and 41 of FIGURE 2. In this "monochrome" position, the entire mask assembly is de-energized and produces no color filtering action.

To utilize the invention, the viewer pushes the actuation knob 32 to the left for color filtering action, and in so doing properly registers the aperture plate 8 and the color plate 7, while energizing the solenoid 18. For monochrome viewing, the viewer pulls the actuation knob 32 to the right, thus de-energizing the solenoid 18 and simultaneously bringing the apertures 12 in the aperture plate 8 into juxtaposition with the clear stripes in the color plate 7.

Figure 3:
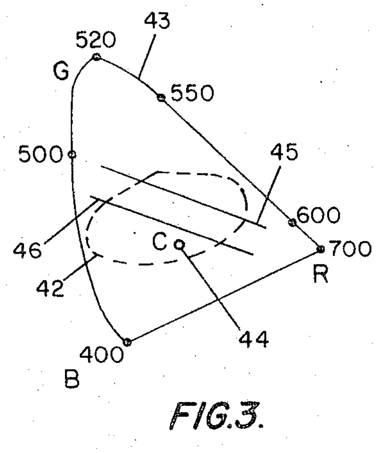
FIGURE 3 is a color chromaticity diagram showing the loci of natural colors and those produced by the color mask.

A lengthly investigation of colors in natural scenes has shown that the greatest density of occurrence lies within the locus 42 of FIGURE 3. This density locus 42 is shown in relation to the spectrum locus 43, which is well known in illumination art. The white point 44 is also shown for comparison. When merely two primary colors are used, as in the present invention, it is desirable to choose the colors so as to accommodate a maximum number of hues in the scenes to be encountered. It is well known that mixtures of two primary colors produce a straight line locus on the chromaticity diagram, and it is therefore desirable to place this locus in the region of maximum natural color occurrence. In two-color displays, used heretofore, complementary primaries have been employed to avoid biasing neutral or gray tones toward a specific hue. The locus 45 would, for example, normally be unacceptable because it does not pass sufficiently close to the white point 44 and thus will render all neutrals yellow-green. In the present invention, the two primary colors are switched at a 30 c.p.s. rate corresponding to successive fields of the display. At this switching rate, the human eye tends to shift hues toward blue. While the reasons for this physiological shift are not entirely understood, they are at least partly due to the well-known complementary after-image effect. For example, a yellow component in a specific field leaves a blue after-image that is superimposed on a following field. This has the effect of shifting the apparent hue of the following field toward blue. If the two primaries chosen for the display are both displaced toward yellow, as indicated by locus 45, examination of the mask while stationary shows it to consist of cyan (blue-green) at a wavelength of 500 millimicrons in one position, and orange-red at about 605 millimicrons in the other. When the mask is vibrated, however, the cyan is noted to change the apparent hue in the blue direction and the orange-red similarly swings toward red, resulting in a virtual locus of nearly complementary character, as shown by 46 in FIGURE 3. Accordingly, the invention employs primary colors lying at wavelengths of approximately 500 millimicrons and 605 millimicrons, respectively, to accommodate the apparent shift in hue when vibratory motion is imparted to the mask.

It will be understood from the foregoing that the present invention will, with unusual simplicity, provide stable rendering of scenes in black-and-white imagery and will additionally produce a well-balanced two-color display.

What is claimed is:

1. In a color television display system comprising a cathode-ray tube having a target area, and scanning means associated with said tube to scan said target area successively and cyclic, the combination of a color mask interposed in a light path which includes the target area of said tube, a first rigid member of said mask having two colored stripes with primary colors light transmissions centered substantially at 500 millimicrons and 605 millimicrons, respectively, a second flexible member having alternate opaque and clears stripes, a third rigid light-transmitting member fixedly positioned relative to said first member to captivate said flexible member, driving means to cause cyclic movement of said second member in the space between said first member and said third member, and mechanical restrictive means to limit said cyclic movement to that required for bringing the color filter stripes of said first member successively and alternately in register with the light-transmitting stripes of said second-named member.

2. Apparatus as in claim 1 including a further clear stripe adjacent said two colored stripes on said first rigid member controllable means to stop said cyclic movement of second-named member and place said light-transmitting stripes on said first-named member in registration with said light-transmitting stripes on said second-named member.

3. Color television display apparatus comprising a cathode-ray tube having a target area, scanning means associated with said tube to scan said target area successively and cyclicly, a color mask interposed in a light path which includes the target area of said tube, a first rigid plate of said mask having a plurality of two colored stripes with light transmission centered at approximately 500 and 605 millimicrons, respectively arranged in consistent succession, a second flexible plate having alternate opaque and light-transmitting stripes, a third rigid light-transmitting plate fixedly positioned relative to said first plate and loosely holding said second flexible plate in position on the first plate, driving means to cause cyclic movement of said second plate in the space between said first plate and said third plate, and mechanical restrictive means to limit said cyclic movement to that required for bringing the color filter stripes of said first plate successively and alternately in register with the light-transmitting stripes of said second-named plate.

4. Apparatus as in claim 3 including a further clear stripe adjacent said two colored stripes on said first rigid plate controllable means to stop said cyclic movement of second-named plate and place said light-transmitting stripes on said first-named plate in registration with said light-transmitting stripes on said second-named plate.

5. In a system for converting monochrome images to colored images, wherein said monochrome images appear in sequence, means for viewing alternate ones of said images in sequence via different color filters, said color filters being vibratory screens and having principal light transmission wavelengths of approximately 500 millimicrons and 605 millimicrons, respectively, wherein said color filters include identical sets of color stripes, said sets arranged in sequence to form a filter, and each set of stripes including one stripe transmitting at a wavelength of substantially 500 millimicrons and another transmitting at a wavelength of substantially 605 millimicrons.

6. The combination according to claim 5 wherein each of said sets of stripes includes one transparent stripe selectively positionable in register to admit monochrome display.

7. The combination according to claim 6 wherein is provided a transparent stripe, and means for relatively scanning said last named stripe and said color stripes at a rate synchronous with the sequence rate of said monochrome images.

References Cited

UNITED STATES PATENTS

| | | | |
|---|---|---|---|
| 2,457,415 | 12/1948 | Sziklai | 178—5.4 |
| 2,602,854 | 7/1952 | Bedford | 178—5.4 |
| 2,721,893 | 10/1955 | Vanderhooft | 178—5.2 |
| 2,742,524 | 4/1956 | Szklai | 178—5.4 |

OTHER REFERENCES

Land, Experiments in Color Vision, Scientific American, May 1959, vol. 200, No. 5, T1S5, pages 84–99.

JOHN W. CALDWELL, *Acting Primary Examiner.*

DAVID G. REDINBAUGH, *Examiner.*

J. A. O'BRIEN, *Assistant Examiner.*